Figure 1:
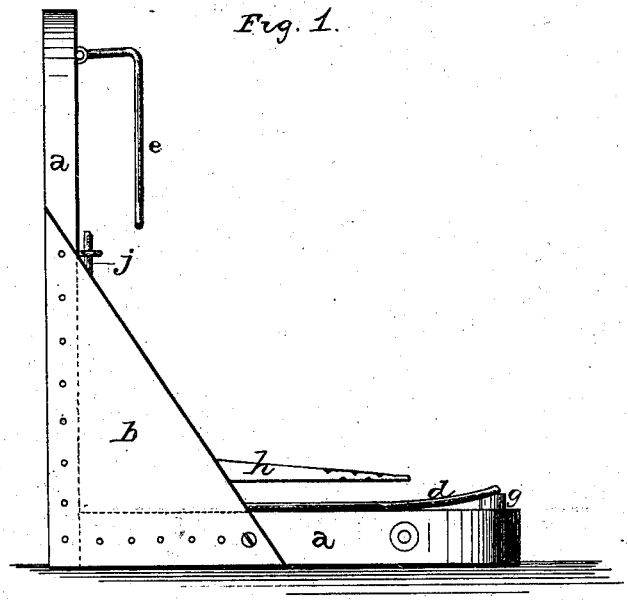
Figure 2:
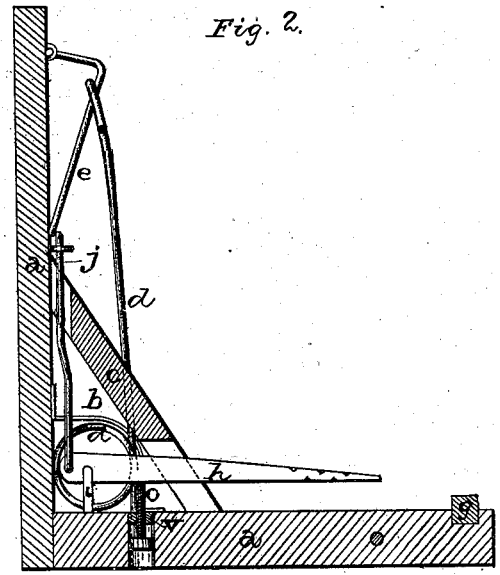

S. EARLE.
ANIMAL-TRAP.

No. 192,980. Patented July 10, 1877.

WITNESSES:
J. Wm. Garner
Albert J. Peyt

INVENTOR:
S. Earl
per
F. A. Lehmann,
Atty.

UNITED STATES PATENT OFFICE.

SIDNEY EARLE, OF CORRY, PENNSYLVANIA.

IMPROVEMENT IN ANIMAL-TRAPS.

Specification forming part of Letters Patent No. 192,980, dated July 10, 1877; application filed February 15, 1877.

*To all whom it may concern:*

Be it known that I, SIDNEY EARLE, of Corry, in the county of Erie and State of Pennsylvania, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in animal-traps; and it consists in the arrangement and combination of devices that will be more fully described hereinafter, whereby a cheap, simple, and effective trap is produced for catching animals of all kinds.

The accompanying drawings represent my invention.

$a$ represents two pieces of board of suitable length and width, which are braced on the sides by the triangular pieces $b$. This frame is further braced by means of the piece of board $c$, which also serves to hide the greater part of the mechanism from sight. The spring $d$, that catches the animals, has its two ends coiled, as shown, and fastened to the lower board in such a manner that the act of raising the outer portion to catch it under the latch $e$ tightens the coil still more.

When the catch is tripped the spring descends with great power, and either kills the animal or chokes it to death. In order to prevent the recoil of the spring from injuring the board, a rubber cushion, $g$, is fastened to the board to receive the force of the blow in case the spring should not catch the animal.

The spear $h$, on which the bait is placed, is pivoted very near its rear end on the staple $i$, and to its end is fastened the trigger $j$, which catches under the latch $e$. This latch is L-shaped, and catches over the top of the spring when raised. By pulling slightly upward on the bait on the roughened end of the spear, the trigger is drawn downward, thereby releasing the latch and spring. The latch is made L-shaped, so as to give a leverage on the spring and enable the one setting the trap to manage the spring more readily.

In order to regulate the force necessary to set the trap off, a set-screw, $o$, is passed up through the bottom board, and a nut, $v$, sunk into its face. The screw forms a bearing for the spear, in such a manner that by raising the spear slightly upward at its outer end, the trigger will be correspondingly drawn downward, and hence will not hold the latch so tightly. By depressing the screw the trigger is raised and holds the latch more firmly. The nut prevents the wood from wearing away so that the screw will no longer act.

Having thus described my invention, I claim—

1. In combination with the spring $d$, the L-shaped latch $e$ and trigger $j$, arranged to operate substantially as shown and described.

2. The combination of the set-screw $o$, spear $h$, trigger $j$, and latch $e$, substantially as set forth.

In testimony that I claim the foregoing I have hereunto set my hand this 8th day of February, 1877.

SIDNEY EARLE.

Witnesses:
W. H. KILBOURN,
L. E. GUIGNON.